United States Patent [19]
Ewald et al.

[11] Patent Number: 4,887,513
[45] Date of Patent: Dec. 19, 1989

[54] BRAKE CYLINDER WITH BAYONET CONNECTION

[75] Inventors: Jürgen Ewald, Laatzen; Josef Frania; Roland Glogowschek, both of Hanover, all of Fed. Rep. of Germany

[73] Assignee: WABCO Westinghouse Fahrzeugbremsen GmbH, Hanover, Fed. Rep. of Germany

[21] Appl. No.: 249,146

[22] Filed: Sep. 26, 1988

Related U.S. Application Data

[63] Continuation of Ser. No. 937,757, Dec. 4, 1986, abandoned.

[30] Foreign Application Priority Data

Dec. 7, 1985 [DE] Fed. Rep. of Germany ....... 3543365

[51] Int. Cl.$^4$ .............................................. F01B 7/00
[52] U.S. Cl. .................................... 92/63; 92/64; 92/128; 92/130 A
[58] Field of Search ................. 92/63, 64, 65, 128, 92/130 R, 130 A, 130 B, 169.1, 98 D; 220/298, 300, 301; 403/349

[56] References Cited

U.S. PATENT DOCUMENTS

| RE. 25,669 | 10/1964 | Leighton et al. | 92/130 A X |
|---|---|---|---|
| 1,598,098 | 8/1926 | Muhlbach | 220/300 |
| 3,187,642 | 6/1965 | Cruse | 92/128 |
| 3,625,117 | 12/1971 | Tazelaar | 92/130 A |
| 3,655,090 | 4/1972 | Rothrock et al. | 220/298 |
| 3,703,125 | 11/1972 | Pauliukonis | 92/163 X |
| 4,491,060 | 1/1985 | Boski | 92/130 R X |
| 4,569,276 | 2/1986 | Kytta | 92/169.1 X |
| 4,671,169 | 6/1987 | Hillier | 92/128 X |

FOREIGN PATENT DOCUMENTS

| 2056638 | 5/1971 | Fed. Rep. of Germany . | |
|---|---|---|---|
| 2501282 | 7/1976 | Fed. Rep. of Germany . | |
| 2550206 | 2/1977 | Fed. Rep. of Germany . | |
| 2316594 | 8/1980 | Fed. Rep. of Germany . | |
| 3241547 | 5/1984 | Fed. Rep. of Germany | 92/63 |
| 3241548 | 5/1984 | Fed. Rep. of Germany . | |
| 2000225 | 6/1977 | United Kingdom . | |

Primary Examiner—Robert E. Garrett
Assistant Examiner—Mark A. Williamson
Attorney, Agent, or Firm—J. O. Ray, Jr.

[57] ABSTRACT

The present invention teaches a brake cylinder which is formed by a cylindrical housing and a cylinder base. The cylindrical housing and cylinder base are joined together by a bayonet connection and form a pressure chamber. The bayonet connection is designed pressure-tight, and it is located on the pressurized-side of a circular sealing element which seals off the cylinder base from the cylinder housing. The bayonet connection is thereby protected from the entry of detrimental environmental influences, especially dirt and moisture, and it can still be easily disassembled at all times.

28 Claims, 2 Drawing Sheets

4,887,513

BRAKE CYLINDER WITH BAYONET CONNECTION

This is a continuation of co-pending application Ser. No. 06/937,757 filed on Dec. 4, 1986, now abandoned.

FIELD OF THE INVENTION

The present invention relates, in general, to brake cylinders and, more particularly, the invention relates to a bayonet-type connection to connect a cylinder housing to a cylinder base, which connection protects such brake cylinder against undesirable environmental influences, such as moisture and/or dirt, which might otherwise enter such brake cylinder.

BACKGROUND OF THE INVENTION

Bayonet connections for brake cylinders have previously been described in the prior art. See, for example, German publication DE 32 41 547 A1. As shown in this reference, the formation of the bayonet connection for this particular brake cylinder includes, in the cylinder housing, a recess that is formed by a tab that has been partially punched out and bent radially inward, along with a partially circular groove in the cylinder base in which the above-mentioned recess is engaged. The brake cylinder of this prior art reference thereby offers a bayonet connection which opens to the outside. Therefore, this connection is subject to damage from undesirable environmental influences. Specifically, these environmental influences are usually from moisture and/or dirt, which may enter the brake cylinder to the point where it becomes difficult or even impossible to disassemble.

It is obvious that moisture and dirt entering the brake cylinder, even if it does not present a safety hazard due to a malfunction of a brake, will add to the maintenance cost for the owner of such vehicle due to added wear and corrosion.

SUMMARY OF THE INVENTION

The present invention teaches a brake cylinder that includes a cylinder housing in which is enclosed a pressure chamber which is bordered on one side thereof by a brake piston, and on the other side thereof by a cylinder base. The cylinder base includes a portion which projects axially into the cylinder housing; such portion forming an axial overlap region with such cylinder housing. A circular sealing element is provided which seals off the pressure chamber, and is positioned in the above-referenced overlap region. The cylinder housing and the cylinder base are joined together by a bayonet connection; such bayonet connection being formed in the overlap region by one of at least one radial projection and at least one radial recess in the cylinder housing, and respectively one of a complementary at least one radial projection and a complementary at least one radial recess in the cylinder base. The bayonet connection is located on the side of the pressure chamber facing the circular sealing element, and the radial projection or the radial recess are formed air-tight in the cylinder housing.

OBJECTS OF THE INVENTION

It is, therefore, one of the objects of the present invention to provide a brake cylinder including a bayonet connection which allows easy disassembly at any time.

Another object of the present invention is to provide a brake cylinder in which the bayonet connection is enclosed in the pressurized region of the brake cylinder, and is thereby protected from undesirable external environmental influences.

Still another object of the present invention is to provide a brake cylinder including a bayonet connection in which the cylinder housing can be formed from relatively thin and lightweight materials.

Yet another object of the present invention is to provide a brake cylinder having a bayonet connection, which can be designed not only as a service brake cylinder but as a spring brake cylinder, or a combination service brake and spring brake cylinder as well.

In addition to the above objects and advantages of the present invention, various other objects and advantages thereof will become more readily apparent to those persons skilled in the braking art from the following more detailed description, when such description is taken in conjunction with the attached drawing FIGURES and the appended claims.

BRIEF DESCRIPTION OF THE INVENTION

Figure 1:
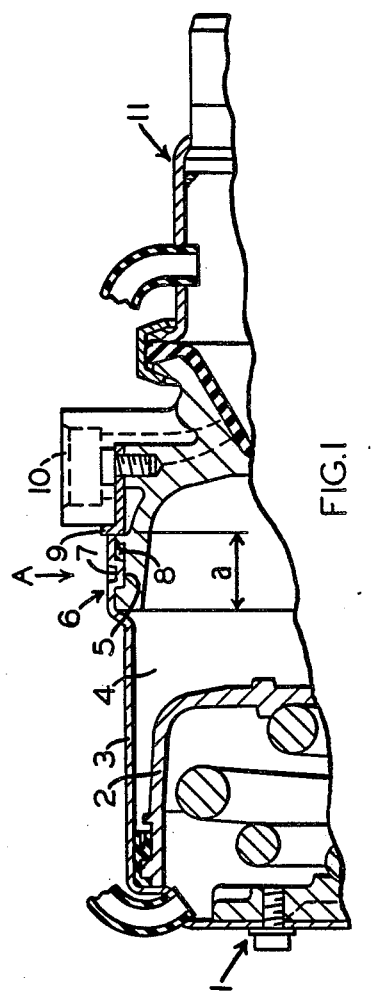
FIG. 1 is a fragmentary cross-sectional view showing one presently preferred form of a bayonet connection for a brake cylinder constructed according to the present invention.
Figure 2:
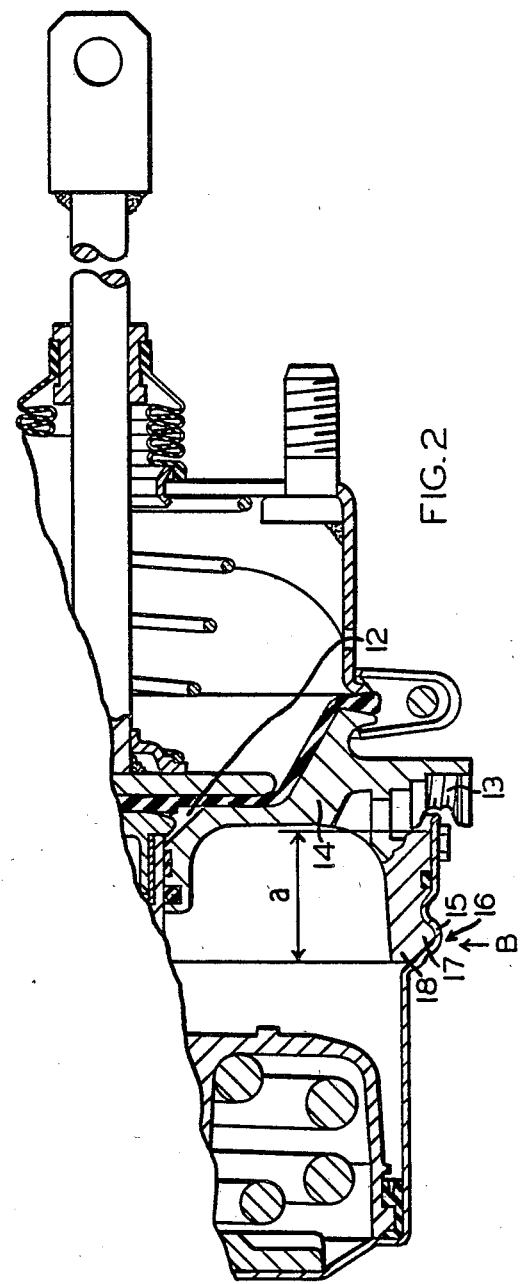
FIG. 2 is a fragmentary cross-sectional view showing an alternative embodiment of a presently preferred bayonet connection for a brake cylinder constructed according to the present invention.

Now referring more particularly to the several views of the drawings, the combined spring and service brake cylinder includes (as shown in FIGS. 1 and 2) a spring brake actuator portion 1 serving as the spring brake cylinder, and a service brake portion 11 serving as the service brake cylinder. Each of these portions 1 and 11, taken separately, is constructed according to the prior art, whereby the brake application force of the brake piston 2 of the spring portion 1 is transmitted by means of the piston (not shown in any greater detail) and the brake application force of the service brake portion 11 to the brake apparatus located downstream (not shown in any further detail).

Positioned intermediate the two above-mentioned cylinder portions 1 and 11, there is an intermediate flange 14 which, with its surface facing the service brake portion 11, borders its pressure chamber 12, and also contains the pressure medium feed 10 to the latter.

The spring portion 1 represents a brake cylinder, whose release chamber 4 represents a pressure chamber enclosed in a cylinder housing 3. The pressure chamber is bordered on one side by the spring piston serving as the brake piston 2, and on the other side by the intermediate flange 14 serving as the cylinder base. A portion 18 of the intermediate flange 14, projecting axially into the cylinder housing 3, forms an axial overlapping area (a) with the cylinder housing 3. In this overlapping area (a) there is, in a circular groove of the intermediate flange 14, a circular sealing element 8 contributing to the seal of the release chamber 4. The sealing element 8 includes a first axial side facing the release chamber 4, and a second axial side facing the environment. In the intermediate flange 14, there is also provided a pressure medium feed 13 to the release chamber 4.

The cylinder housing 3 and the intermediate flange 14 are joined together by a bayonet connection (illustrated generally as 6 in FIG. 1 and as 16 in FIG. 2) which is located in the overlap region (a) next to the first axial side of the sealing element 8 facing the release chamber 4.

In its details, the configuration of the bayonet connection (illustrated as 6 in FIG. 1) differs from the configuration of the bayonet connection (illustrated as 16 in FIG. 2).

The bayonet connection 6 (FIG. 1) is formed by the engagement of a plurality of predetermined radial recesses distributed on the circumference of the cylinder housing 3 with a corresponding number of complementary radial recesses in the intermediate flange 14. Examples of this configuration are, in cross-section, a recess 7 in the cylinder housing 3 and a recess 5 in the intermediate flange 14, which latter exhibits the shape of a circular groove with axial connections (shown at 30 in FIG. 3) toward the release chamber 4; and to make the fabrication more economical, it is combined with the circular groove for the sealing element 8. In another configuration, the recesses 5 can be designed as individual recesses, each with an axial connection to the release chamber 4. Attached to the intermediate flange 14 is an angle bracket 9, the leg of which is bent away from the intermediate flange 14 and which serves as a means to prevent the bayonet connection 6 from twisting during service.

The bayonet connection 16 (FIG. 2) results from the engagement of a predetermined plurality of radial projections distributed on the circumference of the cylinder housing 3 with a complementary number of projections in the intermediate flange 14. Examples of this configuration are shown in cross-section as a projection 15 in the cylinder housing 3, and another projection 17 in the intermediate flange 14. The bayonet connection 16 is prevented from twisting by screwing the cylinder housing 3 together with the intermediate flange 14 by means of a radial screw (not shown here in any greater detail).

It should be apparent to those skilled in the art that the illustrated configurations of bayonet connections can be used interchangeably, and other devices known in the prior art can be used to prevent twisting.

The abovementioned bayonet connections can also consist only of the individual recesses or projections, described by way of example, as long as they are of the proper size. The recesses 7 in the cylinder housing 3 (illustrated particularly in FIG. 1) and the projections 17 in the intermediate flange 14 (illustrated particularly in FIG. 2) can also be designed in the form of buttons or can be extended in the longitudinal direction.

The abovementioned recesses 7 and the projections 15 in the cylinder housing 3 must, however, be pressure-tight in themselves and in their connection to the cylinder housing 3. This can be guaranteed, for example, by making them one piece, or by means of a pressure-tight attachment, for example, by welding, to the cylinder housing.

As a result of the abovementioned pressure-tight configuration and the location of the bayonet connections 6 and 16 respectively, on the pressurized side of the sealing elements 8, detrimental environmental influences cannot penetrate into the bayonet connection either via the bayonet connections 6 or 16, or via the circular gap between the cylinder housing 3 and the intermediate flange 14 at the end of the cylinder housing 3. In other words, the bayonet connections 6 and 16 are protected against the entry of environmental influences, such as moisture and dirt, which means that the spring portion 1 shown schematically and which takes the place of a brake cylinder, is and will remain capable of being disassembled at any time in the reverse sequence of the process described below.

The cylinder housing 3 of the embodiments illustrated is preferably a molded part. The abovementioned recesses 7 and the projections 15 can therefore be manufactured economically as stamped beads. This solution is also possible if the cylinder housing 3 can be molded only in the vicinity of the recesses or the projections; for example, if it is a cold-extruded aluminum part, which exhibits thick walls at points outside the overlapping region (a) for reinforcement.

If a specialist in the braking field were to hypothesize the elimination of the service brake cylinder 11, then he would see that the intermediate flange 14 could be simplified into an ordinary cylinder base of the spring portion 1. This embodiment would consequently represent a brake cylinder designed purely as a spring cylinder.

If, in the base described above, the specialist in the braking field were to eliminate the strong actuator spring (which is not described in any further detail) or to replace it by a return spring, then the embodiment would also represent a service brake cylinder as a pulling model. By placing the piston rod (not described in any further detail) on the other side of the piston, with an appropriate passage through the end surface of the cylinder housing and a closing of the piston rod passage shown in the embodiment through the cylinder base, the pulling-type service brake cylinder can be made a pushing-type service brake cylinder.

Figure 3:
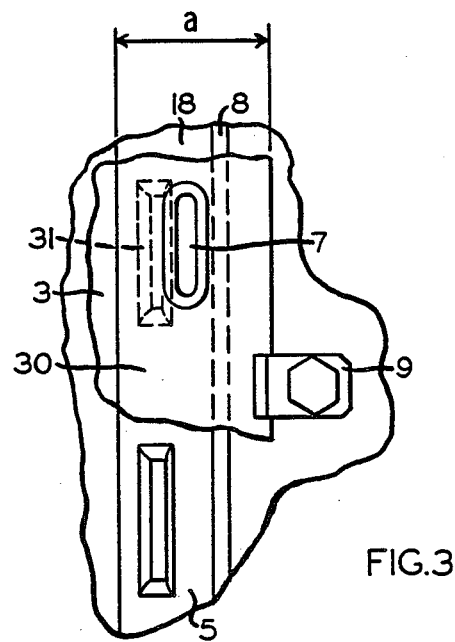
FIG. 3 is a fragmentary plan view taken in the direction of arrow A in FIG. 1, showing details of the bayonet connection.
Figure 4:
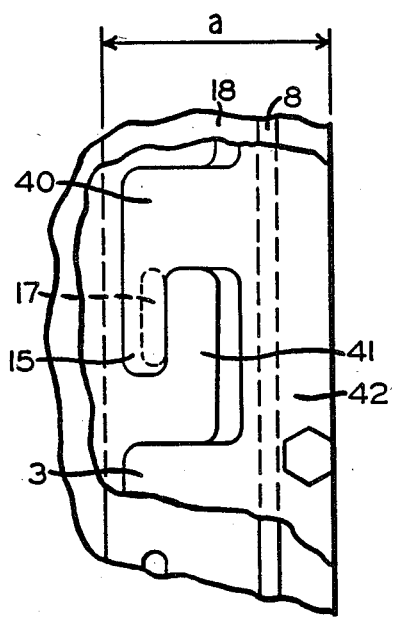
FIG. 4 is a fragmentary plan view taken in the direction of arrow B in FIG. 2, showing details of an alternative bayonet connection.

FIGS. 3 and 4 show views of the bayonet connections 6 and 16 in the directions A and B respectively in FIGS. 1 and 2.

FIG. 3 shows the circular groove 5 in the portion 18 of the intermediate flange 14 projecting into the cylinder housing 3. Both the recess 7 of the cylinder housing 3 and the sealing element 8 are located in this groove 5. The FIGURE also shows an axial connection 30 as the passage in the joint 31 bordering the groove 5 toward the release chamber. The connection 30 has, in the circumferential direction, essentially the same length as the recess 7 and serves to join together the brake cylinder designed as the spring portion 1. To connect this joint, the sealing element 8 is first placed in the groove 5, then the cylinder housing 3 and the intermediate flange 14 are pushed axially into one another, so that the recess 7 goes through the connection 30 into the groove 5. Then, by turning the cylinder housing 3 or the intermediate flange 14, or both of them relative to one another, the recess 7 is placed in the position shown, whereby the cylinder housing 3 and the intermediate flange 14 are axially form-fitted to one another. The angle bracket 9 provides the bayonet connection with protection against twisting. To accomplish this purpose in economical fashion, the edge of the cylinder housing 3 is cut out for the leg of the angle bracket 9, which is bent upward, as shown in the drawing. The above-mentioned form-fitting connection, between the cylinder housing 3 and the intermediate flange 14, is kept free of play under normal conditions by the release pressure in the release chamber 4; and by the fact that the actuator spring, in the activated state, is braced against the cylinder housing 3. In other configurations, specifically when these conditions are not constantly present, this freedom from play can be achieved by placing the recess 7 and the sealing element 8 in the common groove 5 under mutual prestress. In these configurations, if the grooves are separate (as the specialist in the braking field will be aware) to achieve the customary or required freedom from play, a sufficiently precise working of the recess 7 and the complementary recess in the cylinder housing 14 is necessary.

FIG. 4 shows the circumferential projection 15 and, in dotted lines, the complementary projection 17 running in the circumferential direction in the intermediate flange 14. The projection 15 is connected by a connection 40 with the edge of the cylinder housing 3. As a result of this connection 40, when the brake cylinder (represented by the spring portion 1) is assembled, the projection 17 can penetrate into the cylinder housing 3 until it meshes with the projection 15. The width of the connection 40 in the circumferential direction, and its height, must therefore be harmonized to the corresponding dimensions of the projection 17. The connection 40 provides transitions into an expanded portion 42, running around the edge of the cylinder housing 3; the inside diameter is equal to at least the free height of the connection 40. The sealing element 8 creates a sealed working connection with the circular, inner surface of the expanded portion 42, when assembled. The area marked 41, between the projection 15, the expansion 42, and the adjacent connections 40, is lower in relation to the latter. In a configuration not illustrated, the projections 15 in the cylinder housing 3 can be designed as a circular projection, specifically in the form of a circular bead.

In the assembly of the brake cylinder illustrated in FIG. 4, the abovementioned steps are executed accordingly. To achieve the abovementioned freedom from play, the remarks made above for the case of separate grooves apply.

As can be seen from the above description of the invention, the objects and advantages thereof can easily be obtained.

It should also be noted that the pressure medium feed line to the pressure chamber can be advantageously-located in the cylinder base, if desired.

Furthermore, in the brake cylinder of the type described above, with a cylinder housing of drawn sheet metal, the axial forces on the end surfaces are absorbed by the sheet metal tabs which are partly punched out and bent radially inward, and are transferred to the cylinder base. The size of the support surfaces is determined by the product of the sheet metal thickness and the total arc length of all the inwardly-bent tabs. On cylinders with relatively thin walls, therefore, a comparatively high specific surface load must be expected at the connecting or support surfaces. This load is particularly critical if the cylinder housings and/or the cylinder base are made of aluminum alloy(s). The invention, on the other hand, offers the advantage that in a brake cylinder of the type described above, a cylinder housing of relatively thin sheet metal materials can be used, including one made of aluminum alloy(s) and/or a cylinder base made of aluminum alloy(s).

It should also be noted that in the case of a combined brake cylinder, the cylinder base can be economically-designed as the intermediate flange connecting the individual cylinders. In this case, the intermediate flange can border, on one hand, the pressure chamber of the spring brake cylinder which serves in the manner of the prior art as the releasing chamber; and on the other hand, a pressure chamber of the service brake cylinder.

While both a number of presently preferred embodiments of the present invention, as well as a number of alternatives thereto have been described in detail above, it should be understood by those in the braking field art that other modifications and adaptations can be made without departing from the spirit and scope of the appended claims.

We claim:

1. A brake cylinder, said brake cylinder comprising:
   (a) a cylindrical housing portion;
   (b) a cylindrical base portion connected to said housing portion, said base portion including a portion projecting axially into said housing portion, which forms an axial overlapping region with said housing portion;
   (c) a brake piston positioned for reciprocal movement within said housing portion;
   (d) a pressure chamber bordered on one side by said brake piston, and on the other side by said base portion;
   (e) a circular sealing element positioned in said overlapping region to seal off said pressure chamber;
   (f) said housing portion and said base portion being joined together by a bayonet connection, and formed in said overlapping region by one of at least one radial projections and at least one radial recess in said housing portion and, respectively, a complementary radial projection and a complementary radial recess in said base portion; and
   (g) said bayonet connection being axially positioned on a pressure side of said circular sealing element, whereby said seal permits the maintaining of a positive pressure on said bayonet connection.

2. A brake cylinder, according to claim 1, wherein said base portion includes a fluid pressure medium inlet to communicate fluid pressure to said pressure chamber.

3. A brake cylinder, according to claim 2, wherein said brake cylinder further includes a spring positioned in said housing portion adjacent said brake piston for applying a brake, and said pressure chamber is a brake release chamber.

4. A brake cylinder, according to claim 3, wherein said bayonet connection is formed by recesses, and a recess in said base portion is a circular groove which holds said sealing element.

5. A brake cylinder, according to claim 2, wherein said bayonet connection is formed by recesses, and a recess in said base portion is a circular groove which holds said sealing element.

6. A brake cylinder, according to claim 1, wherein said brake cylinder further includes a spring positioned in said housing portion adjacent said brake piston for applying a brake, and said pressure chamber is a brake release chamber.

7. A brake cylinder, according to claim 6, wherein said base portion includes an intermediate flange on a side away from a spring brake cylinder of which a service brake cylinder is located, thereby forming a combined spring-operating brake cylinder.

8. A brake cylinder, according to claim 7, wherein said intermediate flange has an axial surface facing away from said release chamber and borders a pressure chamber of said service brake cylinder.

9. A brake cylinder, according to claim 8, wherein said intermediate flange includes a fluid pressure medium feed to said pressure chamber of said service brake cylinder.

10. A brake cylinder, according to claim 9, wherein said bayonet connection is formed by recesses, and a recess in said base portion is a circular groove which holds said sealing element.

11. A brake cylinder, according to claim 8, wherein said bayonet connection is formed by recesses, and a recess in said base portion is a circular groove which holds said sealing element.

12. A brake cylinder, according to claim 7, wherein said bayonet connection is formed by recesses, and a recess in said base portion is a circular groove which holds said sealing element.

13. A brake cylinder, according to claim 6, wherein said bayonet connection is formed by recesses, and a recess in said base portion is a circular groove which holds said sealing element.

14. A brake cylinder, according to claim 1, wherein said bayonet connection is formed by recesses, and a recess in said base portion is a circular groove which holds said sealing element.

15. A brake cylinder, said brake cylinder comprising:
   (a) a cylindrical housing portion formed from sheet metal;
   (b) a cylindrical base portion connected to said housing portion, said base portion including a portion projecting axially into said housing portion, which forms an axial overlapping region with said housing portion;
   (c) a brake piston positioned for reciprocal movement within said housing portion;
   (d) a pressure chamber bordered on a first side by said brake piston, and on a second side by said base portion;
   (e) a circular sealing element positioned in said overlapping region to seal off said pressure chamber;
   (f) said housing portion and said base portion being joined together by a bayonet connection, said bayonet connection formed in said overlapping region by one of at least one radial projection and at least one radial recess in said housing portion and, respectively, a complementary radial projection and a complementary radial recess in said base portion;
   (g) said at least one radial projection and said at least one radial recess, respectively, in said housing portion being stamped as one of an outer and an inner pressure-tight bead on a portion of said housing portion running in a circumferential direction; and
   (h) said bayonet connection being axially positioned on a side of said circular sealing element facing said pressure chamber.

16. A brake cylinder, according to claim 15, wherein said base portion includes a fluid pressure medium inlet to communicate fluid pressure to said pressure chamber.

17. A brake cylinder, according to claim 16, wherein said brake cylinder further includes a spring positioned in said housing portion adjacent said brake piston for applying a brake, and said pressure chamber is a brake release chamber.

18. A brake cylinder, according to claim 17, wherein said bayonet connection is formed by recesses, and a recess in said base portion is a circular groove which holds said sealing element.

19. A brake cylinder, according to claim 16, wherein said bayonet connection is formed by recesses, and a recess in said base portion is a circular groove which holds said sealing element.

20. A brake cylinder, according to claim 15, wherein said brake cylinder further includes a spring positioned in said housing portion adjacent said brake piston for applying a brake, and said pressure chamber is a brake release chamber.

21. A brake cylinder, according to claim 20, wherein said base portion includes an intermediate flange on a side away from a spring brake cylinder of which a service brake cylinder is located, thereby forming a combined spring-operating brake cylinder.

22. A brake cylinder, according to claim 21, wherein said intermediate flange has an axial surface facing away from said release chamber and borders a pressure chamber of said service brake cylinder.

23. A brake cylinder, according to claim 22, wherein said intermediate flange includes a fluid pressure medium feed to said pressure chamber of said service brake cylinder.

24. A brake cylinder, according to claim 23, wherein said bayonet connection is formed by recesses, and a recess in said base portion is a circular groove which holds said sealing element.

25. A brake cylinder, according to claim 22, wherein said bayonet connection is formed by recesses, and a recess in said base portion is a circular groove which holds said sealing element.

26. A brake cylinder, according to claim 21, wherein said bayonet connection is formed by recesses, and a recess in said base portion is a circular groove which holds said sealing element.

27. A brake cylinder, according to claim 20, wherein said bayonet connection is formed by recesses, and a recess in said base portion is a circular groove which holds said sealing element.

28. A brake cylinder, according to claim 15, wherein said bayonet connection is formed by recesses, and a recess in said base portion is a circular groove which holds said sealing element.

* * * * *